(12) United States Patent
Smith et al.

(10) Patent No.: US 9,646,727 B2
(45) Date of Patent: May 9, 2017

(54) SYSTEM AND APPARATUS FOR VISUAL INSPECTION OF A NUCLEAR VESSEL

(75) Inventors: Brandon Lee Smith, Wilmington, NC (US); Colin F. Kelemen, Wilmington, NC (US); Vladimir V. Ghita, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1614 days.

(21) Appl. No.: 13/197,418

(22) Filed: Aug. 3, 2011

(65) Prior Publication Data

US 2013/0033594 A1    Feb. 7, 2013

(51) Int. Cl.
H04N 7/18    (2006.01)
G21C 17/013    (2006.01)

(52) U.S. Cl.
CPC .................................. *G21C 17/013* (2013.01)

(58) Field of Classification Search
CPC ..................................................... G21C 17/013
USPC ........................................................... 348/83
See application file for complete search history.

(56) References Cited

U.S. PATENT DOCUMENTS

| | | | |
|---|---|---|---|
| 4,169,758 A * | 10/1979 | Blackstone et al. | 376/249 |
| 4,311,556 A * | 1/1982 | Iwamoto et al. | 376/249 |
| 4,502,407 A * | 3/1985 | Stevens | 114/222 |
| 5,193,405 A * | 3/1993 | Oomichi et al. | 73/865.8 |
| 5,809,099 A | 9/1998 | Kim | |
| 7,715,516 B2 | 5/2010 | Smith et al. | |
| 2004/0218091 A1 | 11/2004 | Eichenberger | |
| 2005/0045751 A1 | 3/2005 | Nance et al. | |
| 2005/0135904 A1 | 6/2005 | Wivagg et al. | |
| 2006/0226668 A1 | 10/2006 | Smith | |

FOREIGN PATENT DOCUMENTS

| | | |
|---|---|---|
| AU | 627484 B2 | 8/1992 |
| GB | 2359049 A | 8/2001 |
| JP | 61-209392 A | 9/1986 |
| JP | 08-005578 | 1/1996 |
| JP | H08 334593 A | 12/1996 |

(Continued)

OTHER PUBLICATIONS

Search Report issued in connection with EP Application No. 12177970.6 Nov. 12, 2012.

(Continued)

*Primary Examiner* — Gims Philippe
*Assistant Examiner* — Matthew Kwan
(74) *Attorney, Agent, or Firm* — Harness, Dickey & Pierce, P.L.C.

(57) ABSTRACT

Embodiments provide a system and apparatus for visual inspection of a nuclear vessel. The system includes a submersible remotely operated vehicle (SROV) system that is movable to an area within a nuclear vessel. The SROV system includes a maneuverable inspection camera assembly for visual inspection of nuclear vessel components, where the inspection camera assembly is maneuverable in relation to the SROV system. The system also includes a control system located in an area remote from the area within the nuclear vessel. The control system is configured to control the movement of the SROV system and the maneuvering of the inspection camera assembly.

29 Claims, 8 Drawing Sheets

(56) References Cited

FOREIGN PATENT DOCUMENTS

| | | |
|---|---|---|
| JP | 09-159788 | 6/1997 |
| JP | 09-222491 | 8/1997 |
| JP | 2003084090 A | 3/2003 |
| JP | 2003337192 A | 11/2003 |
| JP | 2004212194 A | 7/2004 |
| JP | 2004294373 A | 10/2004 |
| JP | 2005-233766 | 9/2005 |
| JP | 2008-261807 A | 10/2008 |

OTHER PUBLICATIONS

Search Report and Written Opinion from corresponding EP Application No. 12177970.6, dated May 14, 2013.
Japanese Office Action dated Feb. 20, 2014 issued in JP 2012-167878 (with translation).
Office Action dated Nov. 25, 2014 from corresponding Japanese Patent Application No. 2012-167878 (with English language translation).

\* cited by examiner

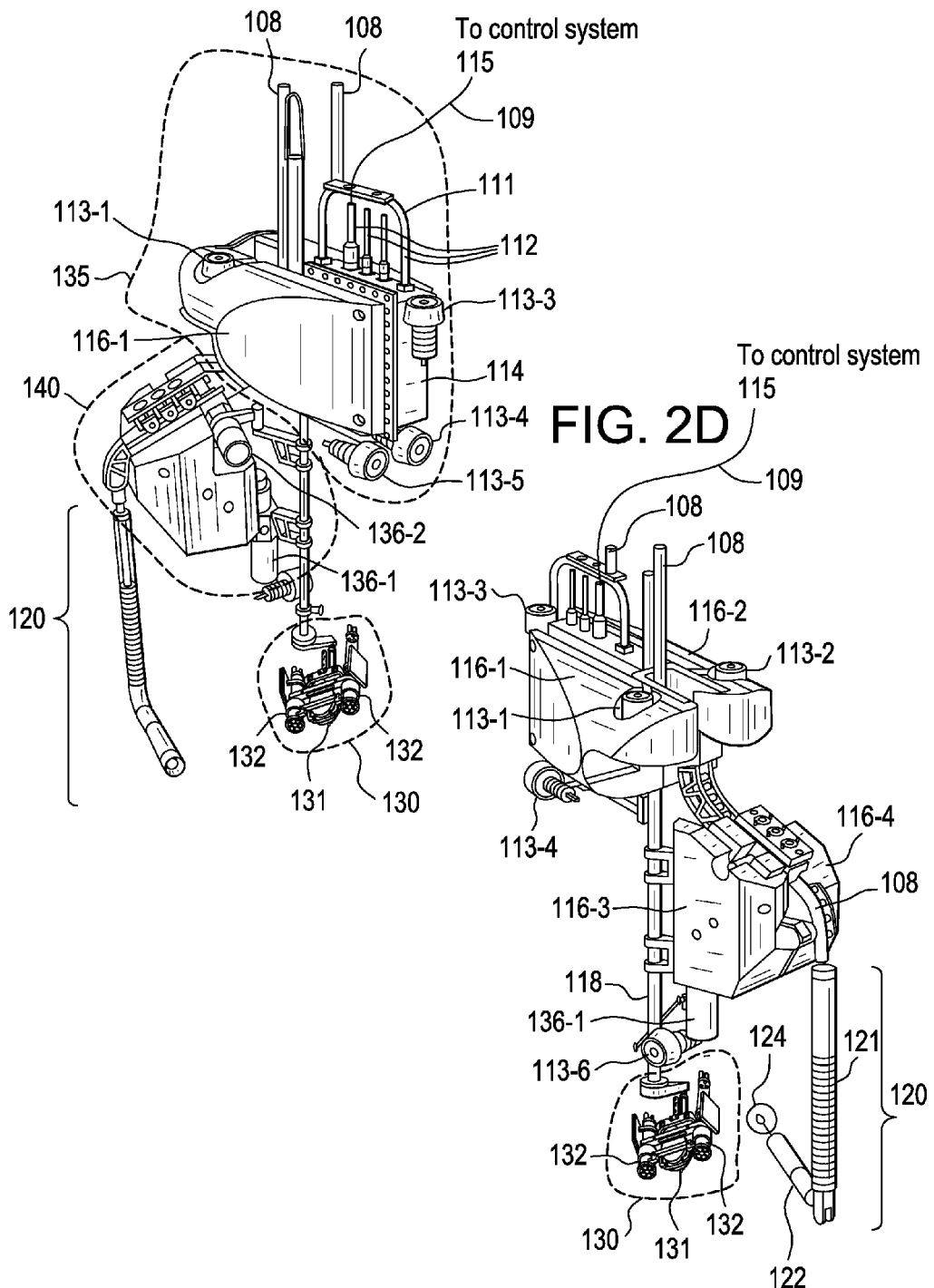

SYSTEM AND APPARATUS FOR VISUAL INSPECTION OF A NUCLEAR VESSEL

BACKGROUND

All nuclear power plants are required to perform visual inspections of specific welds at specified intervals. The conventional method of such a visual inspection attaches a camera on one end of a long pole or rope, and the attached camera is lowered via the pole or rope to an inspection area. Technicians manually deliver these cameras just above the reactor core. This places the technicians in a hazardous environment, as they are exposed to moderate amounts of radiation. Due to the large scope of the required inspections, a high number of technicians are staffed to perform the scope in a minimum time period. This high quantity of personnel is costly for nuclear operators. Related to the different personnel performing these inspections, are the differences in how each technician/inspector performs the specific inspection. These technicians are usually suspended in a large obtrusive platform in or on the water, and this platform interferes with other in-vessel outage activities and can be time consuming and costly to maintain, install and remove.

Furthermore, part of the examination process is the requirement to clean the weld before the inspection. The conventional method requires either a brush or hydrolyzing wand to be mounted to an end of a long pole, which is in addition to the pole or rope for the inspection camera. As such, the inspection and cleaning process is a time consuming process, as it requires multiple pole or rope installations and removals to perform a given inspection.

SUMMARY

Embodiments provide a system and apparatus for visual inspection of a nuclear vessel.

The system includes a submersible remotely operated vehicle (SROV) system that is movable to an area within a nuclear vessel. The SROV system includes a maneuverable inspection camera assembly for visual inspection of nuclear vessel components, where the inspection camera assembly is maneuverable in relation to the SROV system. The system also includes a control system located in an area remote from the area within the nuclear vessel. The control system is configured to control the movement of the SROV system and the maneuvering of the inspection camera assembly.

In one embodiment, the SROV system includes at least one discharge device attached to the inspection camera assembly, and the at least one discharge device is configured to discharge cleaning fluid to an inspection area. The control system is further configured to control the discharge of the cleaning fluid, and the control system is connected to the SROV system via a control cable. The control system may include a first display unit configured to display the visual inspection performed by the inspection camera assembly, at least one second display unit configured to display a position of the SROV system within the nuclear vessel, a valve system configured to control pressure and flow of the cleaning fluid discharged via the at least one discharge device, and an operational control unit configured to permit a user to control at least one of the movement of the SROV system, the maneuvering of the camera assembly, and the valve system. Further, the operational control unit may b e configured to display tracking information based on the position of the SROV system within the nuclear vessel The SROV system may include a plurality of propulsive devices configured to move the SROV system to the area within the nuclear vessel, and the plurality of propulsive device are remotely controlled by the control system. The plurality of propulsive devices permit the SROV system to move horizontally, vertically, and rotationally about an axis of the SROV system.

The SROV system may include a mechanism configured to maneuver the inspection camera assembly. For example, the mechanism is configured to drive a cable that is connected to the inspection camera assembly to move the inspection camera assembly in a vertical direction. The mechanism is also configured to move the inspection camera assembly in a horizontal direction.

The SROV system may include a cable retraction mechanism having a pulley to operate the cable and a flotation device connected to the pulley, where the cable retraction mechanism is configured to maintain a tautness of the cable. The cable retraction mechanism may include other components to maintain a tautness of the cable.

The SROV system may include a frame assembly having a vertical structure, a n arm assembly connected to the vertical structure driven via a first motor, where the arm assembly is movable about an axis of the first motor, and the first motor is remotely controlled by the control system.

In one embodiment, the inspection camera assembly is connected to the arm assembly via a cable and is vertically movable via a second motor that controls movement of the cable, and the second motor is remotely controlled by the control system.

The inspection camera assembly may include a camera manipulator having tilt and pan mechanisms, and an inspection camera. The inspection camera is connected to the camera manipulator. The tilt and pan mechanisms permit the inspection camera to be moveable with respect to the camera manipulator, and the camera manipulator is remotely controlled by the control system.

The SROV system may include a first positional camera for viewing a first perspective of the SROV system within the nuclear vessel, and a second position camera for viewing a second perspective of the SROV system within the nuclear vessel.

The SROV system may include an attachment mechanism configured to attach the SROV system to the area of the nuclear vessel and permit the SROV system to move to different positions on the area. The area of the nuclear vessel may be one of a shroud and Reactor Pressure Vessel (RPV) flange.

The system may further include a n observation camera positioned on or near the RPV flange. Also, the SROV system may include an integrated calibration system configured to calibrate an inspection camera of the inspection camera assembly.

Embodiments of the present application also provide a submersible remotely operated vehicle (SROV) system for visual inspection of a nuclear reactor. The SROV system includes a device that is movable to an area within a nuclear vessel. The device includes a maneuverable inspection camera assembly for visual inspection of nuclear vessel components. The inspection camera assembly is maneuverable in relation to the device, and the movement of the device and the maneuvering of the inspection camera assembly is remotely controlled.

The SROV system may include at least one discharge device attached to the inspection camera assembly, and the at least one discharge device is configured to discharge cleaning fluid to an inspection area.

The SROV system may include a plurality of propulsive devices configured to move the device to the area within the nuclear vessel, and the plurality of propulsive devices are remotely controlled. The plurality of propulsive devices permit the device to move horizontally, vertically, and rotationally about an axis of the device.

The SROV system may include a mechanism configured to maneuver the inspection camera assembly. The mechanism is configured to drive a cable that is connected to the inspection camera assembly to move the inspection camera assembly in a vertical direction. The mechanism is also configured to move the inspection camera assembly in a horizontal direction.

The SROV system may include a cable retraction mechanism having a pulley to operate the cable and a flotation device connected to the pulley, where the cable retraction mechanism is configured to maintain a tautness of the cable. The cable retraction mechanism may include other components to maintain a tautness of the cable.

The SROV system may include a frame assembly having a vertical structure, and an arm assembly connected to the vertical structure driven via a first motor, where the arm assembly is movable about an axis of the first motor, and the first motor is remotely controlled.

In one embodiment, the inspection camera assembly is connected to the arm assembly via a cable and is vertically movable via a second motor that controls movement of the cable, and the second motor is remotely controlled.

The inspection camera assembly may include a camera manipulator having tilt and pan mechanisms, and an inspection camera. The inspection camera is connected to the camera manipulator. The tilt and pan mechanisms permit the inspection camera to be moveable with respect to the camera manipulator, and the camera manipulator is remotely controlled.

The SROV system may include a first positional camera for viewing a first perspective of the device within the nuclear vessel and a second position camera for viewing a second perspective of the device within the nuclear vessel.

The SROV system may include an attachment mechanism configured to attached the device to the area of the nuclear vessel and permit the device to move to different positions on the area. Also, the SROV system may include an integrated calibration system configured to calibrate an inspection camera of the inspection camera assembly.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein:

FIGS. 2A-2D illustrate different views of a submersible remotely operated vehicle (SROV) system according to an embodiment;

DETAILED DESCRIPTION OF EXAMPLE EMBODIMENTS

Figure 1:
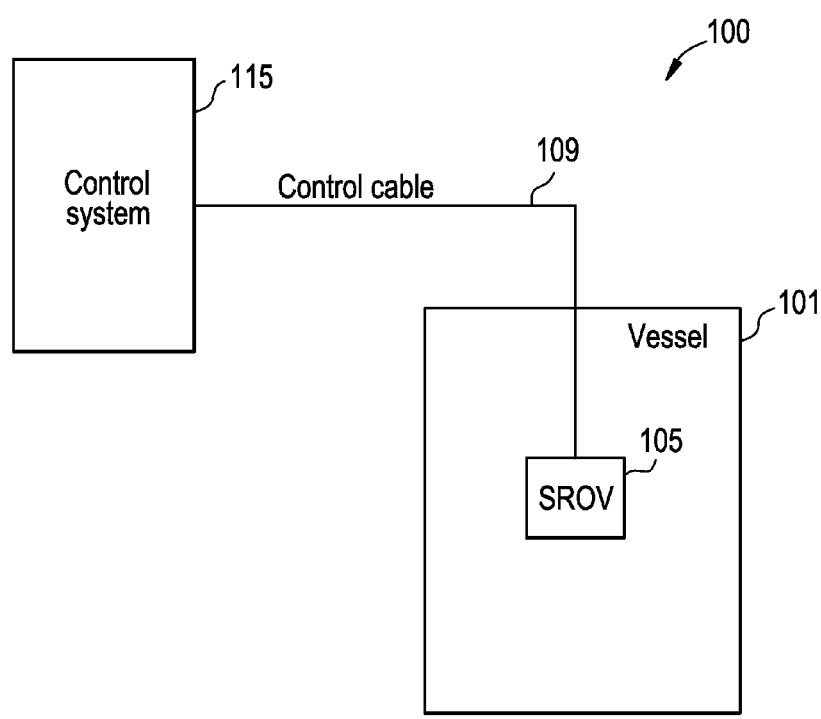
FIG. 1 illustrates a system for visual inspection of a nuclear reactor according to an embodiment.

Various example embodiments will now be described more fully with reference to the accompanying drawings in which some example embodiments are shown. Like numbers refer to like elements throughout the description of the figures.

It will be understood that, although the terms first, second, third, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It should be understood that when an element or component is referred to as being "on," "connected to," "coupled to," or "covering" another element or layer, it may be directly on, connected to, coupled to, or covering the other element or layer or intervening elements or components may be present. In contrast, when an element is referred to as being "directly on," "directly connected to," or "directly coupled to" another element or layer, there are no intervening elements or layers present.

Spatially relative terms (e.g., "beneath," "below," "lower," "above," "upper," and the like) may b e used herein for ease of description to describe one element or feature's relationship to another element(s) or feature(s) as illustrated in the figures. It should b e understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which the embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

The visual inspection system and apparatus of the present disclosure provide the capability to remotely manipulate a camera to perform inspections in a nuclear vessel of a reactor. The system and apparatus utilizes a motion control system that allows an operator to be located away from the harsh radioactive environment. For example, the operator uses a control system to maneuver a submersible remotely operated vehicle (SROV) system into a particular area (e.g., shroud or Reactor Pressure Vessel flange) of the nuclear vessel, where a certain component is to be inspected at multiple locations within the reactor vessel. Once the SROV system is in the general location, an inspection camera assembly mounted on the SROV is maneuvered to a more specific location required to perform the inspection.

Furthermore, the system of the embodiments provides a cleaning assembly to clean the inspection area. For example, a high-pressure water pump and a series of computer-controlled values are provided at the control system to control the flow and pressure of cleaning fluid to be discharged via a discharge device (e.g., nozzle) mounted on the camera inspection assembly of the SROV system. As such, the SROV system provides a visual overview for the operator while cleaning the inspection area.

FIG. 1 illustrates a system 100 for visual inspection of a nuclear reactor according to an embodiment. The system 100 includes a submersible remotely operated vehicle (SROV) system 105 to be operated within a nuclear vessel 101, where the SROV system 105 is connected to a control system 115 via a control cable 109. The control cable 109 includes a plurality of electrical control wires for the transmission of control signals and a minimum of one hose for the transmission of cleaning fluid. The control system 115 is located in an area remote from the area within the nuclear vessel 101. For example, the control system 115 may be located in an area, where the effects of radiation are minimized. The control system 115 is configured to control movement of the SROV system 105, various functions of the SROV system 105 (e.g., a cleaning function), and the maneuvering of specific components within the SROV system 105, by transmitting (and/or receiving) signals to (and/or from) the SROV system 105. These features are further explained below.

FIGS. 2A-2D illustrate different views of the SROV system 105 according to an embodiment.

Figure 2A:
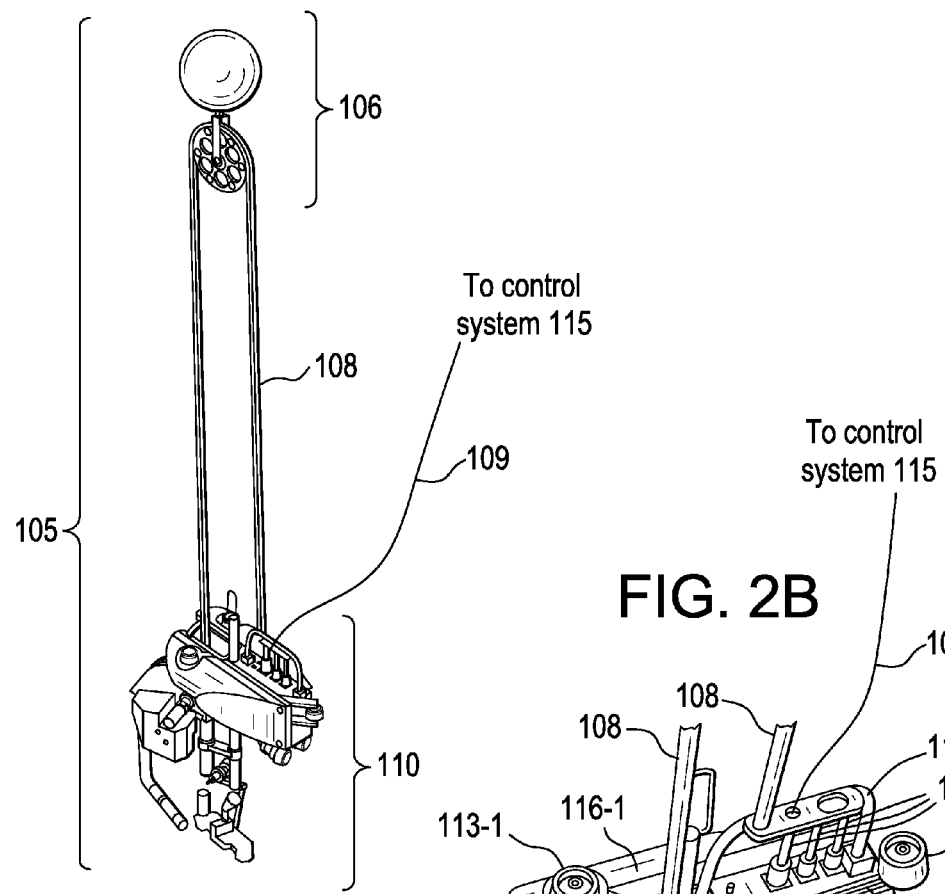
Figure 2B:
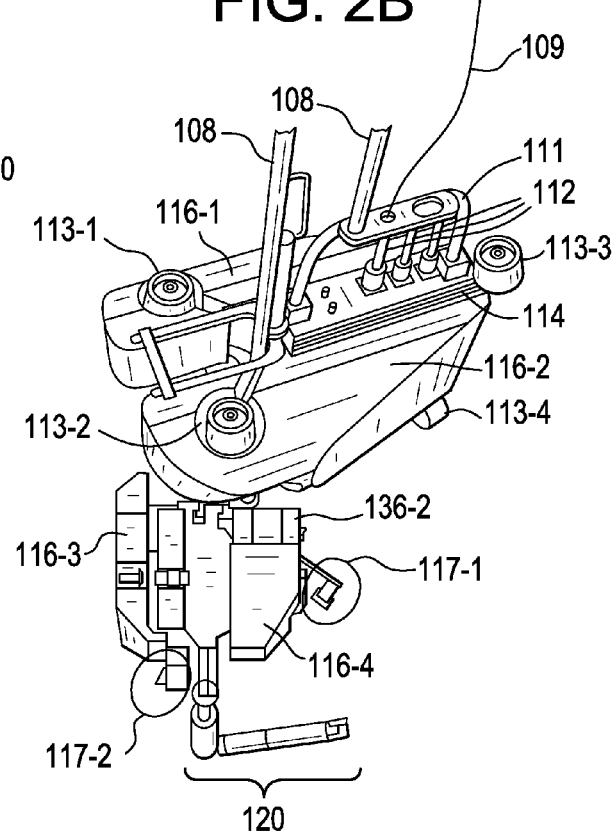

In FIG. 2A, the SROV system 105 includes a main device 110 and a cable retraction mechanism 10 6. The cable retraction mechanism 106 is configured to maintain a tautness of a cable 108. For example, the cable retraction mechanism 106, which is submersible in the water of the nuclear vessel 101, maintains the excess cable 108 required for operation from the main device 110. This allows the cable 108 to remain taut. Referring to FIGS. 2B and 2D, one end of the cable 108 is connected to an inspection camera assembly 120 (FIG. 2D) and the other end of the cable 108 is connected to a junction unit 114 via at least one connector 112 (FIG. 2B). When the inspection camera assembly 120 is lowered, the cable retraction mechanism 106 allows the tension of the cable 108 to be maintained. The cable retraction mechanism 106 may include a pulley to operate the cable 108 and a floatation device connected to the pulley. However, the cable retraction mechanism 106 may include any other components, which maintain a tautness of the cable 108. The maneuvering of the inspection camera assembly 120 utilizing the cable 108 is further explained below.

Referring to FIGS. 2B-2D, the main device 110 includes a plurality of propulsive devices 113 that are configured to move the SROV system 105 to a certain area within the nuclear vessel 101. The plurality of propulsive devices 113 are remotely controlled by the control system 115. For example, an operator using the control system 115 may direct the SROV system 105 to an area within the nuclear vessel 101 by operating an operational control unit. The details of the control system 115 are further explained with reference to FIG. 6. Based on the operator's instructions, the control system 115 transmits a control signal to the main device 110 of the SROV system 105 via the control cable 109. This control signal controls the amount of thrust each propulsive device 113 generates. Furthermore the control system 115 can be configured to automatically control the amount of thrust each propulsive device 113 generates. This automatic control is initiated when the SROV is commanded to descend to a specified depth or commanded to remain level in the pitch or roll directions. The control cable 109 is connected to the SROV system 105 via at least one connector 112 and a cable support 111. The placement of each propulsive device 113 is further explained below.

Referring to FIGS. 2B-D, the main device 110 of the SROV system 105 includes a frame assembly 135, an arm assembly 140 connected to the frame assembly 135, the inspection camera assembly 120 connected to the arm assembly 140 via the cable 108, and an attachment mechanism 130 configured to attached the SROV system 105 to an area of the nuclear vessel 101. The frame assembly 135 includes the junction unit 114, the cable support 111, and the connectors 112. The junction unit 114 provides the distribution of the control signals from the control system 115 via the cable 109. One end of the cable 108 is connected to the junction unit 114 via connectors 112, which are secured by the cable support 111. The frame assembly 135 also includes a first floatation device 116-1 and a second floatation device 116-2, which provide buoyancy to the main device 110 to rise when submerged in the water of the nuclear vessel 101. Also, the frame assembly 135 includes a first propulsive device 113-1, a second propulsive device 113-2, a third propulsive device 113-3, a fourth propulsive device 113-4, a fifth propulsive device 113-5 and a sixth propulsive device 113-6. The first, second, and third propulsive devices 113-1 to 113-3 permit the SROV system 105 to move vertically, and the fourth, fifth and sixth propulsive devices 113-4 to 113-6 permit the SROV system 105 to move horizontally and rotationally.

In addition, the frame assembly 135 includes a vertical spine 118, which connects the arm assembly 140 and the attachment mechanism 130 to the frame assembly 135. Further, the sixth propulsive device 113-6 may be connected to the vertical spine 118 to move the SROV system 105 about its axis. For example, the sixth propulsive device 113-6 may be connected on the vertical spine 118 below the arm assembly 140 and above the attachment mechanism 130.

As shown in FIGS. 2C and 2D, a first motor 136-1 drives the arm assembly 140 so that the arm assembly 140 is movable about an axis of the first motor 136-1. As a result, the inspection camera assembly 120 can be maneuvered in a more specific location. For example, the arm assembly 140 is connected to the vertical spine 118 via at least one connection point. The first motor 136-1 is provided between one of the connection points and the arm assembly 140 such that the arm assembly 140 pivots about the axis of the first motor 136-1. The first motor 136-1 is controlled by the control system 115. For example, an operator using the control system 115 may direct the arm assembly 140 to a certain position in relation to the axis of the first motor 136-1 by operating an operational control unit. Based on the operator's instructions, the control system 115 transmits a control signal to the main device 110 of the SROV system 105 via the control cable 109. This control signal controls the position of the arm assembly 140.

Also, the SROV system 105 includes a mechanism that is configured to drive the cable 108 that is connected to the inspection camera assembly 120 to move the inspection camera assembly 120 in a vertical direction. For example, the inspection camera assembly 120 is connected to the arm assembly 140 via the cable 108. The arm assembly 140 includes a second motor 136-2 that controls movement of the cable 108. For example, based on the control of the second motor 136-2, the cable 108 slides through the upper portion of the arm assembly 140 thereby lowering or raising the inspection camera assembly 120. As a result, the inspection camera assembly 120 is vertically movable. The second motor 136-2 is controlled by the control system 115. For example, an operator using the control system 115 may direct movement of the inspection camera assembly 120 operating an operational control unit. Based on the operator's instructions, the control system 115 transmits a control signal to the main device 110 of the SROV system 105 via the control cable 109. This control signal controls the second motor 136-2 to move the cable 108, thereby moving the camera assembly 120 in a vertical direction.

Further, the arm assembly 140 includes a third floatation device 116-3 and a fourth floatation device 116-4, which provide buoyancy to the main device 110 when submerged in the water of the nuclear vessel 101.

Also, referring to FIG. 2B, the arm assembly 140 includes a first positional camera 117-1 for viewing a first perspective of the SROV system 105 within the nuclear vessel 101 and a second positional camera 117-2 for viewing a second perspective of the SROV system 105 within the nuclear vessel 101. For example, the first and second positional cameras 117 provide the operator of the SROV system 105 different perspectives on how the SROV system 105 is positioned. The first and second positional cameras 117 are connected to the control cable 109. The main device 110 transmits the positional information from the first and second positional cameras 117 to the control system 115 via the control cable 109. A display device (or multiple display devices) at the control system 115 displays the positional information such that the operator may view the different perspectives of the SROV system 105. This assists the operator to maneuver the SROV system 105 to the correct location.

The inspection camera assembly 120 includes a camera manipulator 121 having tilt and pan mechanisms, and an inspection camera 122. The inspection camera 122 acquires visual information regarding the components of the nuclear vessel 101, which are subject to the inspection. The visual information from the inspection camera 122 is transmitted to the control system 115 via a series of internal wires and the control cable 109, and viewed on a display unit of the control system 115. The inspection camera 122 is connected to the camera manipulator 121. The tilt and pan mechanism of the camera manipulator 121 permit the inspection camera 122 to be moveable with respect to the camera manipulator 121. For example, the inspection camera 122 may be tilted upwards and downwards, and rotated around an axis of the camera manipulator 121 via the tilt and pan mechanisms. The camera manipulator 121 is remotely controlled by the control system 115. For example, an operator using the control system 115 may direct movement of the inspection camera 122 in the upward and downward direction and/ or the rotational direction. Based on the operator's instructions, the control system 115 transmits a control signal to the main device 110 of the SROV system 105 via the control cable 109. This control signal controls the camera manipulator 121 to adjust movement of the inspection camera 122.

Also, the SROV system 105 includes at least one discharge device 124 (e.g., a nozzle) connected to the inspection camera assembly 120. The at least one discharge device 124 is configured to discharge cleaning fluid to an inspection area. The cleaning fluid is transmitted from a pump and valve system to the at least one discharge device 124 via the cable 109. The control system 115 is configured to control discharge of the cleaning fluid to the inspection area. This feature is further explained with reference to FIG. 6.

The attachment mechanism 130 is configured to attach the main device 110 to an area of the nuclear vessel 101 and permit the main device 110 to move to different positions on the area. For example, the attachment mechanism 130 may include a suction device 131 and a minimum of one wheel 132. The suction device 131 permits the SROV system 105 to connect to a surface, and the wheel 132 allows the SROV system 105 to move to different areas of the surface, while the suction device 131 keep the SROV system 105 connected. The operation of the attachment mechanism 130 is controlled by the control system 115.

Figure 3A:
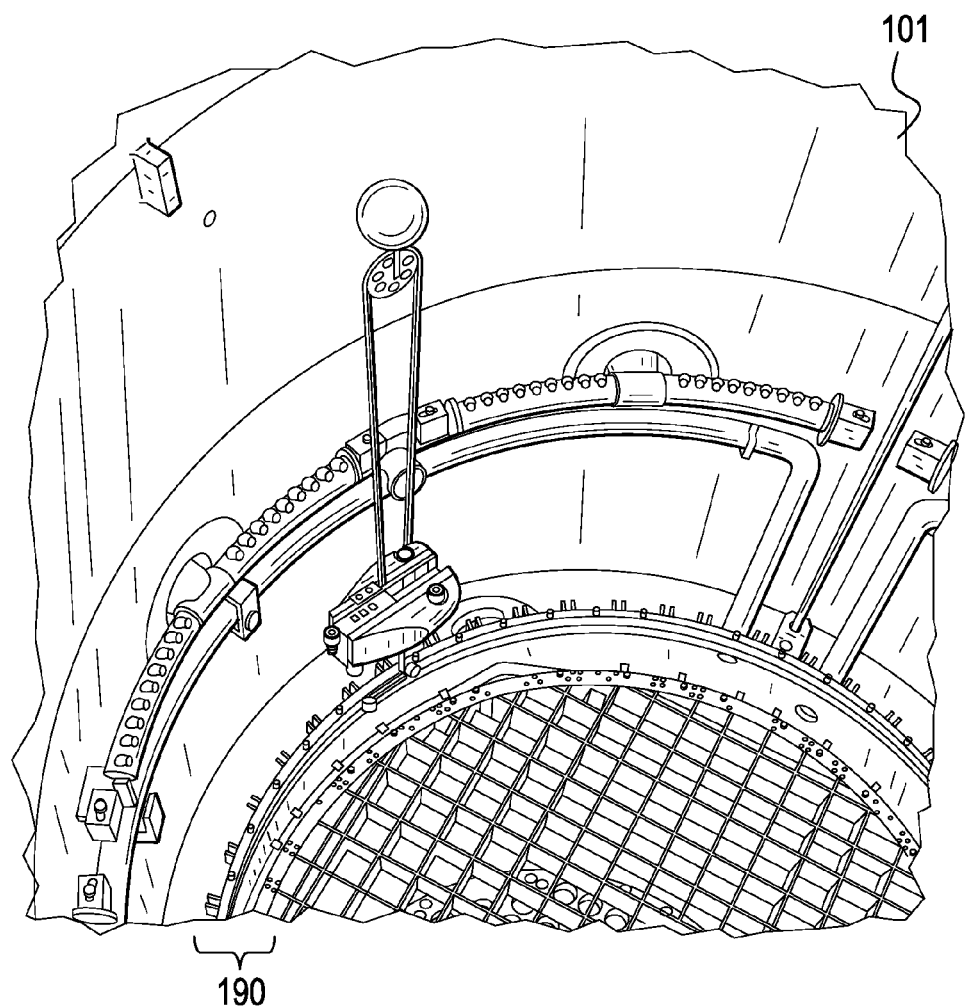
FIGS. 3A and 3B illustrate a portion of a nuclear vessel within the nuclear reactor according to an embodiment.
Figure 3B:
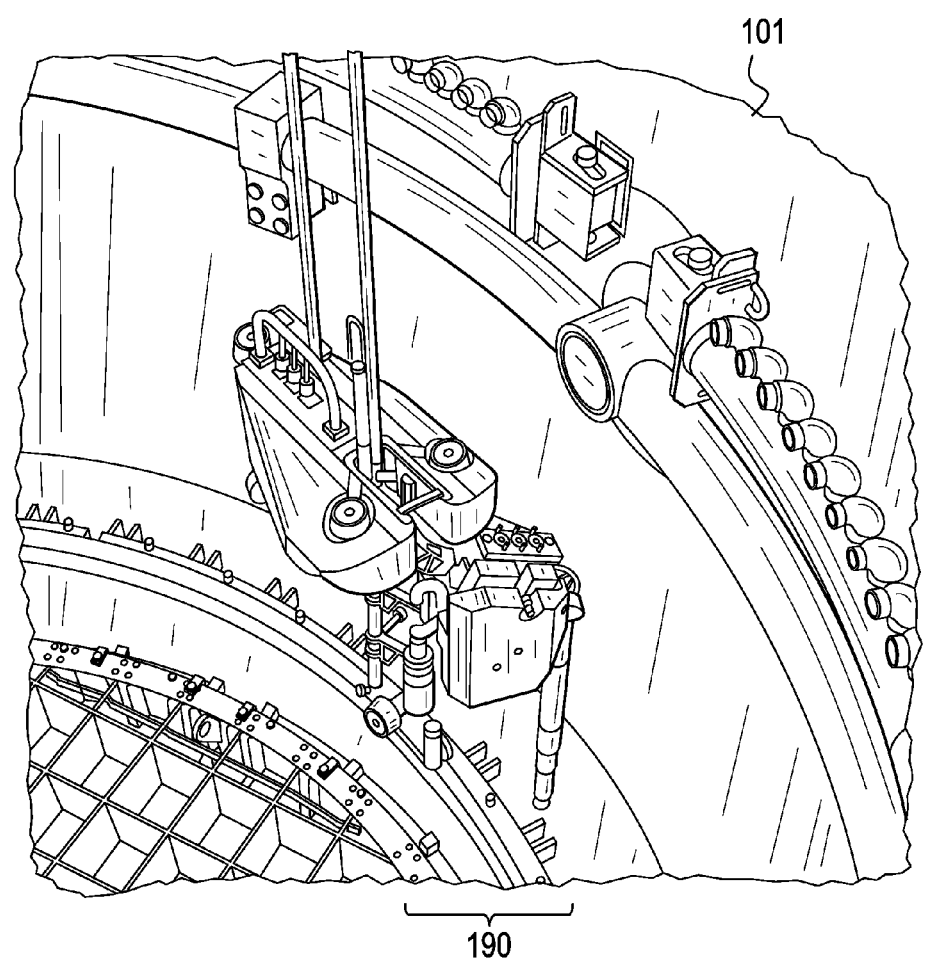

FIGS. 3A and 3B illustrate a portion of the nuclear vessel 101 according to an embodiment.

Referring to FIGS. 3A and 3B, the nuclear vessel 101 includes a shroud 190. The nuclear vessel 101 may include other components that are well known to one of ordinary skill in the art. The SROV system 105 may move to a position at the shroud 190 via the plurality of propulsive devices 113 and the positional cameras 117, and attach itself to the shroud 190 via the attachment mechanism 130. As indicated above, the attachment mechanism 130 permits the SROV system 105 to remain attached to the shroud 190, while moving to different positions on the shroud 190, which extends in a radial direction around the nuclear vessel 101. Once the SROV system 105 is attached to the shroud 190, the inspection camera assembly 120 is maneuverable in the manner described above. As such, the operator may view various components surrounding the shroud 190.

Figure 4:
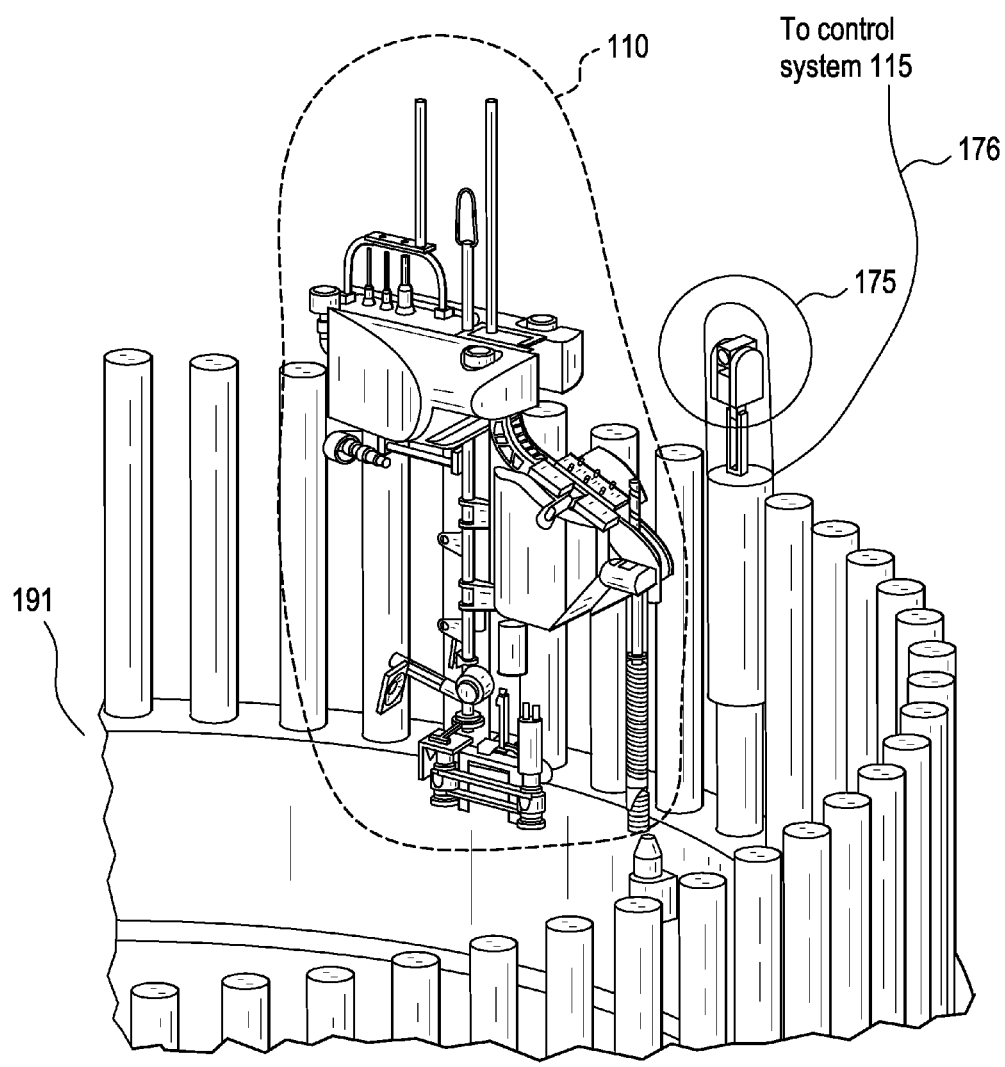
FIG. 4 illustrates another portion of the nuclear vessel according to an embodiment.

FIG. 4 illustrates another portion of the nuclear vessel 101 according to an embodiment. Referring to FIG. 4, the nuclear vessel 101 includes a Reactor Pressure Vessel (RPV) flange 191. The SROV system 105 may move to an area at the RPV flange 191 and attach itself to the RPV flange 191, which extends in a radial direction around the nuclear vessel 101. In the same manner, the attachment mechanism 130 permits the SROV system 105 to remain attached to the RPV flange 191, while moving different positions on the RPV flange 191. Further, the embodiments encompass any other area of the nuclear vessel 101, where the SROV system 105 may attach itself for visual inspection of nuclear components.

Also, the system 100 may further include an observation camera 175 that is positioned on or near the RPV flange 191. The observation camera 175 provides another perspective o n the positioning of the SROV system 105. For example, the observation camera 175 acquires visual information regarding a n area encompassing the RPV flange 191. This visual information is transmitted to the control system 115 via a camera cable 176.

Figure 5:
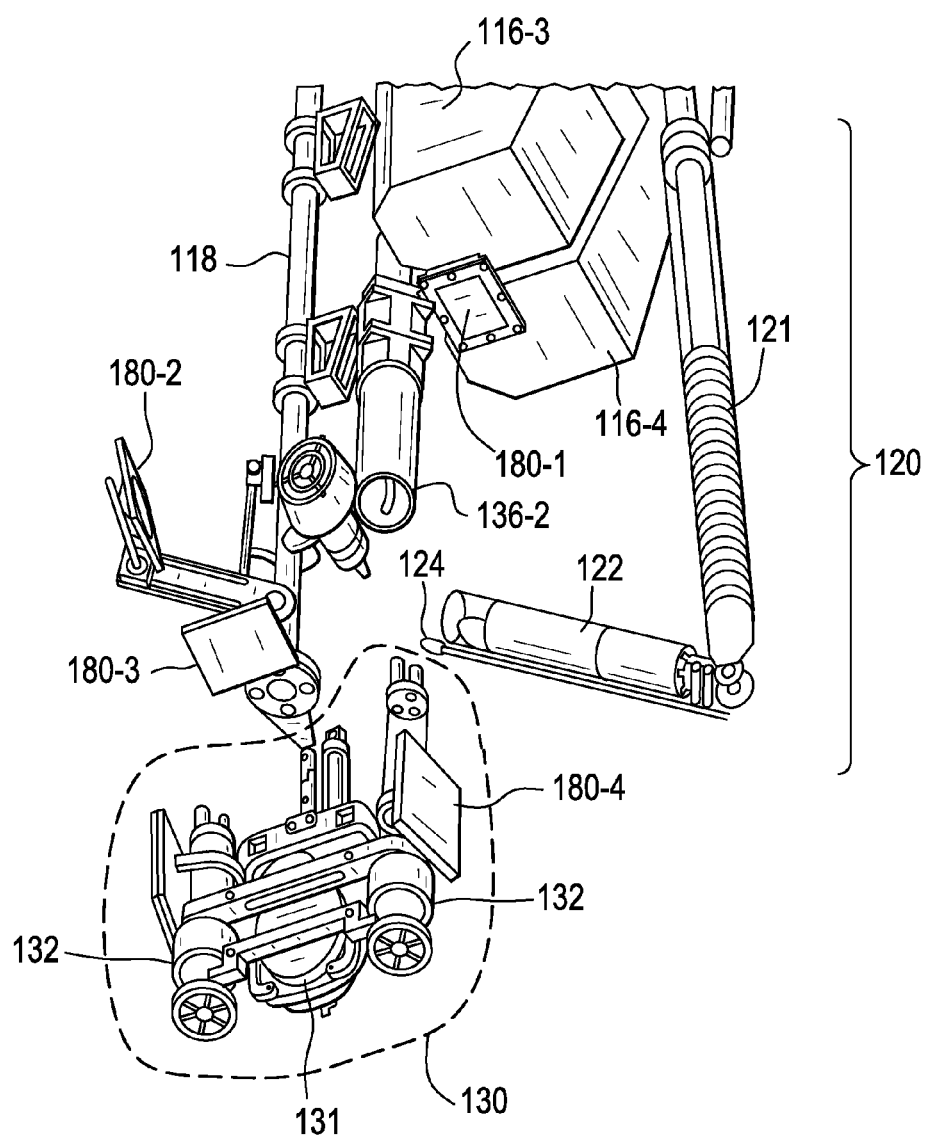
FIG. 5 illustrates an integrated calibration system on the SROV system according to an embodiment.

FIG. 5 illustrates an integrated calibration system on the SROV system 105 according to an embodiment. For example, the SROV system 105 may include an integrated calibration system 180 that is configured to calibrate the inspection camera 122. The integrated calibration system 180 includes a plurality of calibration components—first calibration component 180-1, second calibration component 180-2, third calibration component 180-3, and fourth calibration component 180-4. Each of these components provide reference standards visible by the camera 122 to ensure the camera 122 is appropriately calibrated for the examination.

Figure 6:
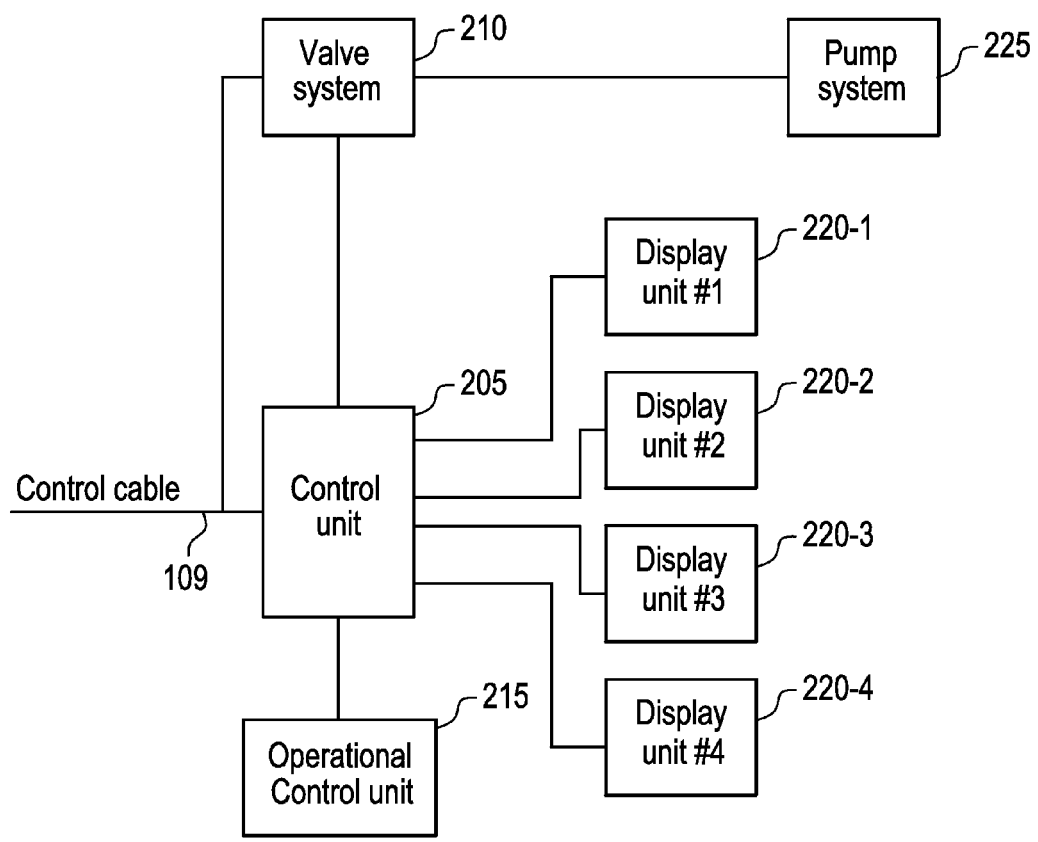
FIG. 6 illustrates a control system for controlling the SROV system according to an embodiment.

FIG. 6 illustrates the control system 115 according to an embodiment. The control system 115 includes a control unit 205, a valve system 210, an operational control unit 215, a plurality of display units 220, and a pump system 225. The control cable 109, in which one end extends to the SROV system 105, is connected to the control unit 205. Further, the control system 115 may include other components that are well known to one of ordinary skill in the art. The operational control unit 215 includes a user interface that allows a n operator to control the discharge of the cleaning fluid, the movement of the SROV system 105 and the maneuvering of the inspection camera assembly 120, as well as any other user controlled function of the system 100. The control unit 205 includes at least one processor and memory storage for controlling operations of the SROV system 105, the valve system 210, and the pump system 225 based on the operator's commands via the operational control unit 215, and for controlling the transmission of visual information from the cameras of the system 100.

The valve system 210 includes a plurality of computer controlled operating valves for controlling the flow and pressure of the cleaning fluid, and the pump system 225 includes at least one pump for controlling the amount of cleaning fluid. For example, an operator may use the operational control unit 215 to enter an instruction that controls the flow and pressure of the cleaning fluid. This instruction is received by the control unit 205, and transmitted to the valve system 210 and the pump system 225. The pump system 225 pumps the appropriate amount of cleaning fluid and the valve system 210 controls the flow and pressure of the cleaning fluid, based on the operator's instruction. The cleaning fluid is then provided to the discharge device 124 via the cable 109.

Also, the control unit 205 is connected to a plurality of display units 220. A first display unit 220-1 may display visual information from the inspection camera assembly 120, a second display unit 220-2 may display visual information from the first positional camera 117-1, a third display unit 220-3 may display visual information from the second positional camera 117-2, and a fourth display unit may display visual information from the observation camera 175. However, the embodiments of the present application encompass any number of display units 220. For example, the visual information from the cameras may be displayed on one display unit, two display units, or any number of display units. The control unit 205 directs the visual information received via the control cable 109 to the respective display unit 220. Based on the information displayed through the display units 220, the operator may remotely control operation of the SROV system 105.

Further, according to one embodiment, the display units 220, the control unit 205, and the operational control unit 215 may be embodied into one or more devices. For example, the control system 115 may include a device such as a touchscreen personal computer (PC). This interface device allows the position of the SROV system 105 to be tracked. For example, the SROV system 105 is positioned in the reactor vessel 101, a reference zero is set, and based on a series of parameters loaded into the control system 115, and the positional feedback information from the SROV system 105 itself, the position of the SROV system 105 is obtained after the SROV system 105 has attached itself to either the RPV flange or the shroud via the attachment mechanism 130. This tracking information may be displayed on the touchscreen PC. As such, the control system 115 allows the ability to track the position of the SROV system 105 once a reference point has been established (e.g., when the main device 110 is attached to a portion of the inspection area via the attachment mechanism 130). In addition, the control system 115 may include a device such as a combo touchscreen PC, in which embodies the display units 220, the control unit 205, and the operational control unit 215 in one unit. However, embodiments of the present application encompass any type of arrangement of the control system 115.

Variations of the example embodiments are not to be regarded as a departure from the spirit and scope of the example embodiments, and all such variations as would be apparent to one skilled in the art are intended to be included within the scope of this disclosure.

What is claimed:

1. A system for visual inspection of a nuclear reactor, the system comprising:
    a submersible remotely operated vehicle (SROV) system that is movable to an area within a nuclear vessel, the SROV system including a maneuverable inspection camera assembly for visual inspection of nuclear vessel components, the inspection camera assembly being maneuverable in relation to the SROV system;
    a control system located in an area remote from the area within the nuclear vessel, the control system configured to control the movement of the SROV system and the maneuvering of the inspection camera assembly;
    a cable suspending the inspection camera assembly from the SROV; and
    a first motor configured to vertically raise and lower the inspection camera assembly on the cable to and from the SROV; and
    an attachment mechanism connected to the SROV system, the attachment mechanism including,
    a suction device configured to impart a suction force on a surface of the nuclear vessel components in order to adhere the SROV system to the surface,
    at least one wheel configured to impart a friction force on the surface in order to move the SROV while the suction device is in operation.

2. The system of claim 1, wherein the SROV system includes at least one discharge device attached to the inspection camera assembly, the at least one discharge device configured to discharge cleaning fluid to an inspection area.

3. The system of claim 2, wherein the control system is further configured to control the discharge of the cleaning fluid, and the control system is connected to the SROV system via a control cable.

4. The system of claim 3, wherein the control system includes:
    a first display unit configured to display the visual inspection performed by the inspection camera assembly;
    at least one second display unit configured to display a position of the SROV system within the nuclear vessel;
    a valve system configured to control pressure and flow of the cleaning fluid discharged via the at least one discharge device; and
    an operational control unit configured to permit a user to control at least one of the movement of the SROV system, the maneuvering of the camera assembly, and the valve system,
    the operational control unit configured to display tracking information based on the position of the SROV system within the nuclear vessel.

5. The system of claim 1, wherein the SROV system includes a plurality of propulsive devices configured to move the SROV system to the area within the nuclear vessel, the plurality of propulsive device being remotely controlled by the control system.

6. The system of claim 5, wherein the plurality of propulsive devices permit the SROV system to move horizontally, vertically, rotationally about an axis of the SROV system.

7. The system of claim 1, wherein the SROV system includes:
a frame assembly having a vertical structure;
an arm assembly connected to the vertical structure driven via a second motor, wherein the arm assembly is movable about an axis of the second motor, the second motor being remotely controlled by the control system.

8. The system of claim 7, wherein,
the inspection camera assembly is connected to the arm assembly via the cable,
the second motor being remotely controlled by the control system.

9. The system of claim 1, wherein the inspection camera assembly includes a camera manipulator having tilt and pan mechanisms, and an inspection camera, the inspection camera being connected to the camera manipulator, the tilt and pan mechanisms permitting the inspection camera to be moveable with respect to the camera manipulator, the camera manipulator being remotely controlled by the control system.

10. The system of claim 1, wherein the SROV system includes:
a first positional camera for viewing a first perspective of the SROV system within the nuclear vessel;
a second position camera for viewing a second perspective of the SROV system within the nuclear vessel.

11. The system of claim 1, wherein the SROV system includes:
an attachment mechanism configured to attach the SROV system to the area of the nuclear vessel and permit the SROV system to move to different positions on the area.

12. The system of claim 11, wherein the area of the nuclear vessel is one of a shroud and Reactor Pressure Vessel (RPV) flange.

13. The system of claim 12, further comprising:
an observation camera positioned on the RPV flange.

14. The system of claim 1, wherein the SROV system includes:
an integrated calibration system configured to calibrate an inspection camera of the inspection camera assembly.

15. A submersible remotely operated vehicle (SROV) system for visual inspection of a nuclear reactor, the SROV system comprising:
a device that is movable to an area within a nuclear vessel, the device including a maneuverable inspection camera assembly for visual inspection of nuclear vessel components, the inspection camera assembly being maneuverable in relation to the device, the movement of the device and the maneuvering of the inspection camera assembly being remotely controlled;
a cable suspending the inspection camera assembly from the SROV; and
a first motor configured to vertically raise and lower the inspection camera assembly on the cable to and from the SROV; and
an attachment mechanism connected to the SROV system, the attachment mechanism including,
a suction device configured to impart a suction force on a surface of the nuclear vessel components in order to adhere the SROV system to the surface,
at least one wheel configured to impart a friction force on the surface in order to move the SROV while the suction device is in operation.

16. The SROV system of claim 15, further comprising:
at least one discharge device attached to the inspection camera assembly, the at least one discharge device configured to discharge cleaning fluid to an inspection area.

17. The SROV system of claim 15, further comprising:
a plurality of propulsive devices configured to move the device to the area within the nuclear vessel, the plurality of propulsive devices being remotely controlled.

18. The SROV system of claim 17, wherein the plurality of propulsive devices permit the device to move horizontally, vertically, rotationally about an axis of the device.

19. The SROV system of claim 15, further comprising:
a mechanism configured to maneuver the inspection camera assembly.

20. The SROV system of claim 19, wherein the mechanism is configured to drive a cable that is connected to the inspection camera assembly to move the inspection camera assembly.

21. The SROV system of claim 20, further comprising:
a cable retraction mechanism configured to maintain a tautness of the cable.

22. The SROV system of claim 15, further comprising:
a frame assembly having a vertical structure;
an arm assembly connected to the vertical structure driven via a second motor, wherein the arm assembly is movable about an axis of the second motor, the second motor being remotely controlled.

23. The SROV system of claim 22, wherein,
the inspection camera assembly is connected to the arm assembly via the cable,
the second motor is remotely controlled.

24. The SROV system of claim 15, wherein the inspection camera assembly includes a camera manipulator having tilt and pan mechanisms, and an inspection camera, the inspection camera being connected to the camera manipulator, the tilt and pan mechanisms permitting the inspection camera to be moveable with respect to the camera manipulator, the camera manipulator being remotely controlled.

25. The SROV system of claim 15, further comprising:
a first positional camera for viewing a first perspective of the device within the nuclear vessel;
a second position camera for viewing a second perspective of the device within the nuclear vessel.

26. The SROV system of claim 15, further comprising:
an attachment mechanism configured to attached the device to the area of the nuclear vessel and permit the device to move to different positions on the area.

27. The SROV system of claim 15, further comprising:
an integrated calibration system configured to calibrate an inspection camera of the inspection camera assembly.

28. The system of claim 1, further comprising:
a submersible cable retraction mechanism configured to support the cable and the submersible inspection camera assembly,
the cable retraction mechanism including a pulley to maintain a tautness of the cable above the SROV system.

29. The system of claim 1, wherein the control system includes, a first camera configured to view the visual inspection performed by the inspection camera assembly,
at least one second camera configured to view a position of the SROV system within the nuclear vessel,
an operational control unit configured to display tracking information based on the position of the SROV system within the nuclear vessel.

* * * * *

UNITED STATES PATENT AND TRADEMARK OFFICE
CERTIFICATE OF CORRECTION

PATENT NO. : 9,646,727 B2
APPLICATION NO. : 13/197418
DATED : May 9, 2017
INVENTOR(S) : Brandon Lee Smith et al.

Page 1 of 1

It is certified that error appears in the above-identified patent and that said Letters Patent is hereby corrected as shown below:

On the Title Page

On the second page:
Under Foreign Patent Documents, --JP 2008-111780 05/2008-- should be added.

In the Claims

At Column 11, Claim number 5, Line number 1, "I" should be --1--.

Signed and Sealed this
Twenty-fourth Day of July, 2018

Andrei Iancu
*Director of the United States Patent and Trademark Office*